(12) United States Patent
Mielke et al.

(10) Patent No.: US 10,823,634 B2
(45) Date of Patent: Nov. 3, 2020

(54) METHOD FOR DETECTING A LEAK IN A FLUID LINE, AND WATER METER WITH A CONTROLLER FOR CARRYING OUT THE METHOD

(71) Applicant: Grohe AG, Hemer (DE)

(72) Inventors: Achim Mielke, Porta Westfalica (DE); Matthias Thesseling, Bochum (DE); Heiko Schoenbeck, Hemer (DE)

(73) Assignee: Grohe AG, Hemer (DE)

( * ) Notice: Subject to any disclaimer, the term of this patent is extended or adjusted under 35 U.S.C. 154(b) by 201 days.

(21) Appl. No.: 15/976,150

(22) Filed: May 10, 2018

(65) Prior Publication Data

US 2018/0328811 A1 Nov. 15, 2018

(30) Foreign Application Priority Data

May 10, 2017 (DE) .................. 10 2017 110 112

(51) Int. Cl.
  *G01M 3/28* (2006.01)
  *F17D 5/02* (2006.01)
  *G08B 21/18* (2006.01)

(52) U.S. Cl.
  CPC ............ *G01M 3/2807* (2013.01); *F17D 5/02* (2013.01); *G01M 3/2815* (2013.01); *G08B 21/182* (2013.01)

(58) Field of Classification Search
  None
  See application file for complete search history.

(56) References Cited

U.S. PATENT DOCUMENTS

| | | | | |
|---|---|---|---|---|
| 3,690,150 A | * | 9/1972 | Mullen | ............ F17D 5/02 73/40.5 R |
| 3,771,543 A | * | 11/1973 | Wiggins | ......... F15B 20/005 137/100 |
| 4,608,857 A | * | 9/1986 | Mertens | .......... G01M 3/2815 73/40.5 R |
| 5,078,006 A | * | 1/1992 | Maresca, Jr. | ......... G01F 1/007 73/40 |

(Continued)

FOREIGN PATENT DOCUMENTS

DE 102006036518 A1 2/2008
EP 2940447 A1 11/2015
(Continued)

*Primary Examiner* — Paul M. West
*Assistant Examiner* — Mark A Shabman
(74) *Attorney, Agent, or Firm* — Muncy, Geissler, Olds & Lowe, P.C.

(57) ABSTRACT

A method for detecting a leak in a fluid line, having at least the following steps: closing the fluid line with a valve to create a pressure chamber in the fluid line; determining a first pressure drop in the pressure chamber; opening the valve after completing the determination of the first pressure drop; closing the fluid line with the valve to create the pressure chamber in the fluid line again; determining a second pressure drop in the pressure chamber; and comparing the first pressure drop with the second pressure drop. Also, a water meter is provided with a valve, a flow sensor, and a pressure sensor, which are connected in a data-carrying manner to a controller, wherein the controller is set up to carry out the method according to the invention.

7 Claims, 1 Drawing Sheet

(56) References Cited

U.S. PATENT DOCUMENTS

| | | | | |
|---|---|---|---|---|
| 5,948,969 A | * | 9/1999 | Fierro | G01M 3/2892 |
| | | | | 73/40.5 R |
| 6,912,472 B2 | * | 6/2005 | Mizushina | G01M 3/2807 |
| | | | | 702/50 |
| 8,746,043 B2 | * | 6/2014 | Windisch | G01M 3/2815 |
| | | | | 73/37 |
| 2006/0059977 A1 | * | 3/2006 | Kates | G01M 3/2807 |
| | | | | 73/40 |

FOREIGN PATENT DOCUMENTS

| WO | WO8901112 A1 | 2/1989 |
|---|---|---|
| WO | WO2007087819 A1 | 8/2007 |

\* cited by examiner

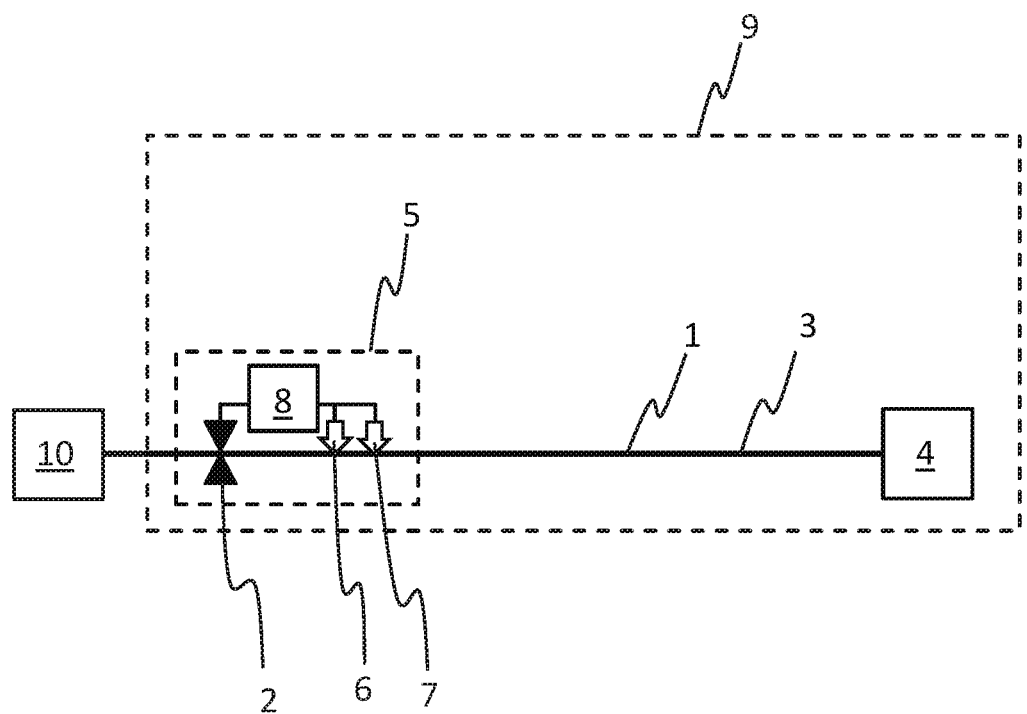

METHOD FOR DETECTING A LEAK IN A FLUID LINE, AND WATER METER WITH A CONTROLLER FOR CARRYING OUT THE METHOD

This nonprovisional application claims priority under 35 U.S.C. § 119(a) to German Patent Application No. DE 10 2017 110 112.8, which was filed in Germany on May 10, 2017, and which is herein incorporated by reference.

BACKGROUND OF THE INVENTION

Field of the Invention

The present invention relates to a method for detecting a leak in a fluid line, and a water meter with a controller for carrying out the method. The invention serves, in particular, to prevent water damage caused by escaping liquids.

Description of the Background Art

In buildings, a multiplicity of water lines are routinely installed that lead from a liquid source, such as, e.g., a public water supply system, to various consumers, such as, e.g., plumbing fixtures, dishwashers, or washing machines. Leaks can arise in these fluid lines, for example in the form of pipe ruptures or cracks, through which liquid can escape. At the points of escape, the escaping liquid can lead to serious damage to the building, to masonry, and/or to furnishings or equipment in the building.

For this reason, a great number of methods for detecting leaks in fluid lines are already known. For example, leaks with great quantities of liquid escaping, such as occur with pipe ruptures, for example, can be detected by means of flow sensors. The flow sensors used in this case require a very large measurement range of up to 100 l/min (liters per minute). As a result, the flow sensors are not suitable for detecting small quantities of liquid escaping, in particular quantities less than 0.7 l/min, such as occur in the case of drip leaks, for example. Such drip leaks can therefore remain undetected for a long time so that the escaping liquid can cause considerable damage, for example through mold or mildew formation.

Hence, in order to detect drip leaks, methods are known in which a pressure drop in the fluid lines caused by drip leaks is measured over a relatively long time period. In these measurement methods the fluid lines must be closed, for example with a valve, over a relatively long time period (e.g., 15 minutes) so that the behavior of a pressure in the fluid lines can be measured during this period. If a consumer of the liquid is activated in the building during the measurement of the pressure drop, the fluid lines must be reopened immediately so that it is possible for a supply of liquid to the consumer to take place without delay. Consequently, this causes the measurement process to be terminated so that it must be repeated at a later point in time. Moreover, this has the result that leaks with liquid discharges in a certain range, in particular 0.3 l/h to 0.7 l/min, cannot be detected with these methods, because drip leaks with liquid discharges in this range cannot be distinguished from (small) liquid draws by consumers. This means that a leak with liquid discharges in this range always causes a termination of the measurement process. Therefore, the known methods are only suitable for detection of drip leaks with liquid discharges in the range of up to 0.3 l/h.

SUMMARY OF THE INVENTION

It is therefore an object of the invention to solve the problems described with reference to the prior art, and in particular to provide a method for detecting a leak in a fluid line with which it is possible to detect drip leaks with liquid discharges in a wider range. An additional object is also to specify a water meter by means of which it is possible to detect leaks with liquid discharges in a wider range.

In an exemplary embodiment, the method according to the invention for detecting a leak in a fluid line includes the steps of: closing the fluid line with a valve to create a pressure chamber in the fluid line; determining a first pressure drop in the pressure chamber; opening the valve after completing the determination of the first pressure drop; closing the fluid line with the valve to create the pressure chamber in the fluid line again; determining a second pressure drop in the pressure chamber; and comparing the first pressure drop with the second pressure drop.

The method serves to detect a leak in a fluid line that runs, in particular, at least partly in a building from a liquid source, such as, e.g., a public water supply system, to at least one consumer, such as, e.g., a plumbing fixture, a dishwasher, or a washing machine. The fluid line is made, in particular, at least partly of metal, such as, e.g., copper. Moreover, the fluid line has a diameter, in particular, of 10 mm (millimeters) to 30 mm.

To detect a leak or drip leak in the fluid line, the fluid line is closed with a valve. The valve is, in particular, an electrically operated valve, for example in the manner of a solenoid valve. In this way, the at least one consumer of the liquid, which can, in particular, be water, can be disconnected from the liquid source, and a pressure chamber can be created in the fluid line between the closed valve and the (closed) at least one consumer.

Next, a first pressure drop in the pressure chamber of the fluid line is determined. This is accomplished through a measurement of the pressure in the pressure chamber over a predetermined measurement period, wherein the pressure drop is the decrease in the pressure during the measurement period. The measurement of the pressure is accomplished, in particular, with a pressure sensor that is located on the fluid line and/or in the pressure chamber of the fluid line.

After completing the determination of the first pressure drop, the valve is opened again, and after the expiration of a predetermined time interval, is closed again to create the pressure chamber in the fluid line again. After the fluid line is closed again, a second pressure drop in the pressure chamber of the fluid line is determined. The determination of the second pressure drop here is accomplished, in particular, in the same manner as the determination of the first pressure drop. After completion of the determination of the second pressure drop, the first pressure drop is compared with the second pressure. The steps can thus carried out sequentially or in chronological order, in particular. The comparison is accomplished, in particular, with the aid of a microcontroller, which is connected to the pressure sensor, in particular in a data-carrying manner, and by means of which the valve can be operated. If the first pressure drop and the second pressure drop are (essentially) identical, this suggests a drip leak. In contrast, if the first pressure drop and the second pressure drop are different, this suggests an intentional liquid draw at the at least one consumer. A drip leak is not present in this case. Due to the comparison of the first pressure drop and the second pressure drop, drip leaks with liquid discharges in a wider range, in particular up to 0.7 l/min, preferably 0.3 l/h to 0.7 l/min, can thus be detected.

In the event of a leak, an alarm signal, in particular, can be issued, by which a user or a resident of the building is informed of the leak. The alarm signal can be sent by cable connection or radio connection, for example, to a network router that relays the alarm signal via the Internet to a (server-based) cloud system. The cloud system can inform the user or resident of the leak by push message to a smartphone, for example.

It is also advantageous if the fluid line is closed with the valve when no liquid draw from the fluid line is taking place by at least one consumer. In particular, the fluid line is closed with the valve when no liquid draw from the fluid line by a consumer is taking place. The presence of a liquid draw by a consumer can be determined, in particular, by means of a flow sensor that likewise can be connected to the microcontroller in a data-carrying manner. If it is determined by means of the flow sensor that the flow rate of the liquid through the fluid line is (essentially) 0 l/min then no liquid draw from the fluid line by the at least one consumer is taking place.

In addition, it is advantageous if the fluid line is closed for three seconds. In particular, the fluid line is closed for 3 seconds. This means, in particular, that the determination of the first pressure drop and/or the determination of the second pressure drop likewise takes place over a measurement period of three seconds.

Preferably, the method is terminated if no first pressure drop can be ascertained. This means, in particular, that the pressure in the pressure chamber remains constant after the fluid line has been closed with the valve. It can be concluded from this that neither a liquid draw by at least one consumer nor a leak is present.

Furthermore, it is advantageous if the valve is opened for at least one minute. This means, in particular, that the determination of the first pressure drop in the pressure chamber and the determination of the second pressure drop in the pressure chamber likewise take place with a time interval of at least one minute.

Moreover it is advantageous if the steps for determining at least one additional pressure drop in the pressure chamber are repeated at least once more after step e) and wherein the first pressure drop, the second pressure drop, and the at least one additional pressure drop are compared with one another. Due to the larger number of measured pressure drops, and the comparison thereof, leaks can be detected with greater reliability over liquid draws by the at least one consumer.

In addition, it is advantageous if the determination of the first pressure drop, of the second pressure drop, and of the at least one additional pressure drop take place with different time intervals. The different time intervals can be determined randomly, for example after 4 minutes, 41 minutes, 43 minutes.

In accordance with another aspect of the invention, a water meter with a valve, a flow sensor, and a pressure sensor, which are connected in a data-carrying manner to a controller, is also specified, wherein the controller is set up to carry out the method according to the invention.

By means of the water meter, it is possible to determine, in particular, a water consumption in a logical unit, as for example a building, an apartment, or a hotel room, so that a liquid, in particular water, can be billed on the basis of consumption. The water meter is located, in particular, in a fluid line through which the liquid can be carried from a liquid source to at least one consumer. In addition, the water meter has a valve, with which the fluid line can be closed, a flow sensor, with which a liquid flow through the fluid line can be determined, and a pressure sensor, with which a pressure or pressure pattern in the fluid line can be determined, which are connected in a data-carrying manner (by cable connection and/or radio connection) to a controller. The controller is, in particular, a microcontroller. The controller is set up and provided for carrying out the method according to the invention. For further details, please refer to the description of the method according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, is not limitive of the present invention, and wherein the sole FIGURE illustrates an example embodiment, showing a building with a water meter.

DETAILED DESCRIPTION

The FIGURE schematically shows a building 9 with a water meter 5. The water meter 5 is located in a fluid line 1, by means of which the liquid can be carried from a liquid source 10 to a consumer 4. The water meter 5 has a valve 2 in the manner of a solenoid valve, by means of which the fluid line 1 can be closed to create a pressure chamber 3 in the fluid line 1. The pressure chamber 3 in this instance extends from the valve 2 to the consumer 4. In addition, the water meter 5 has a pressure sensor 7, by means of which a pressure, and hence a pressure drop, in the pressure chamber 3 can be determined after the fluid line 1 has been closed with the valve 2. Closing of the fluid line 1 with the valve 2 takes place when it is determined by a flow sensor 6 of the water meter 5 that no water draw from the liquid source 10 is taking place through the fluid line 1 by the consumer 4. The valve 2, the flow sensor 6, and the pressure sensor 7 are connected wirelessly or by radio connection to a controller 8 of the water meter 5 so as to carry data. The controller 8 is set up and provided for carrying out the method according to the invention.

With the present invention, drip leaks with liquid discharges in a wider range, in particular up to 0.7 l/min, preferably 0.3 l/h to 0.7 l/min, can be detected.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for detecting a leak in a fluid line, the method comprising:
   closing the fluid line with a valve to create a pressure chamber in the fluid line;
   determining a first pressure drop in the pressure chamber;
   opening the valve after completing the determination of the first pressure drop;
   closing the fluid line with the valve to create the pressure chamber in the fluid line again;
   determining a second pressure drop in the pressure chamber; and
   comparing the first pressure drop with the second pressure drop to determine if a leak exists, such that when the first pressure drop and the second pressure drop are the same, it is determined that the leak exists and when the first pressure drop and the second pressure drop are different, it is determined that the leak does not exist.

2. The method according to claim 1, wherein the fluid line is closed with the valve when no liquid draw from the fluid line by at least one consumer is taking place.

3. The method according to claim 1, wherein the fluid line is closed for three seconds.

4. The method according to claim 1, wherein the valve is opened for at least one minute.

5. The method according to claim 1, wherein at least one additional pressure drop in the pressure chamber is determined, and wherein the first pressure drop, the second pressure drop, and the at least one additional pressure drop are compared with one another.

6. The method according to claim 5, wherein the determination of the first pressure drop, of the second pressure drop, and of the at least one additional pressure drop take place with different time intervals.

7. A water meter comprising:
   a controller;
   a valve;
   a flow sensor; and
   a pressure sensor,
   wherein the valve, the flow sensor, and the pressure sensor are connected in a data-carrying manner to the controller, and
   wherein the controller performs the method according to claim 1.

* * * * *